Figure 4:
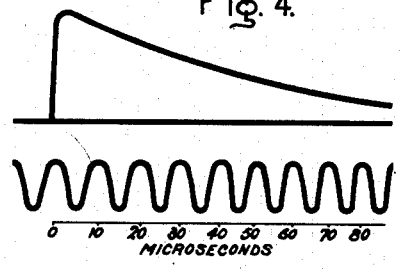

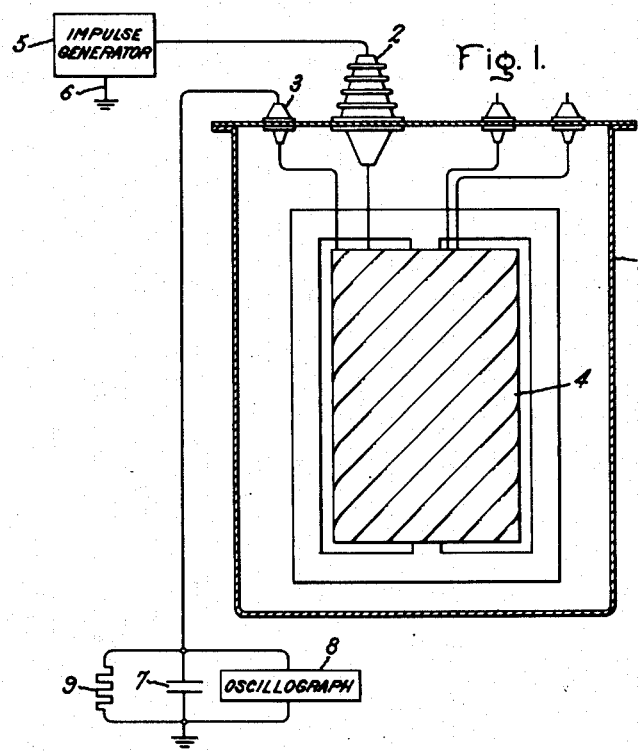
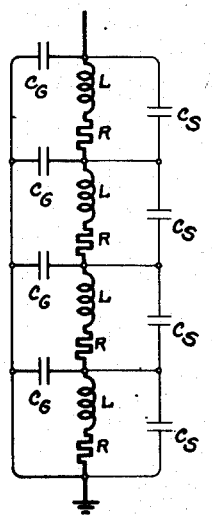
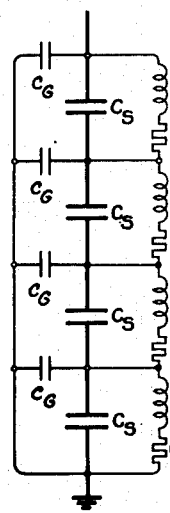

Inventors:
Harold C. Stewart,
James E. Holcomb,
by Ernest C. Britton
Their Attorney.

Inventors:
Harold C. Stewart,
James E. Holcomb,
by Ernest C. Britton
Their Attorney.

Patented Aug. 16, 1949

2,479,426

UNITED STATES PATENT OFFICE 2,479,426

IMPULSE TESTING

Harold C. Stewart and James E. Holcomb, Pittsfield, Mass., assignors to General Electric Company, a corporation of New York Application November 30, 1945, Serial No. 632,056

2 Claims. (Cl. 175—183)

This invention relates to impulse testing and more particularly to improvements in detecting impulse produced failures in distribution transformers.

The ability of a transformer winding to withstand voltage surges when in service is tested by applying to it a steep front voltage impulse from any suitable source, such as a well-known impulse generator. However, certain faults which sometimes develop in a winding when it is impulse tested are extremely difficult to detect by ordinary methods. A sensitive and reliable way of detecting such failures is to measure the voltage drop across a resistor which is connected in series with the winding undergoing test. This is described in an article entitled "Progress in Impulse Testing of Transformers" by J. H. Hagenguth which was published in the Transactions of the American Institute of Electrical Engineers for 1944 at page 999. However, we have found that that method is not well suited to smaller size transformers of the type generally referred to as distribution transformers. If the resistance of the resistor is of the proper value to give the best value of voltage drop for indicating purposes at the beginning of the voltage impulse, then the indication will be too small during the latter portions of the voltage impulse, while if the value of the resistor is high enough to give the proper value of voltage drop during the latter portions of the voltage impulse, then the voltage drop is too high for best indicating purposes during the beginning of the voltage impulse.

In accordance with this invention we employ a capacitor for producing the voltage drop which is to be measured during the impulse test and we have found that this produces much more reliable failure detection than when a resistor is used. In addition we may also connect a resistor in parallel with the capacitor for the purpose of reducing the voltage drop which is measured during the latter portion of the applied voltage impulse. This is because during the application of the voltage impulse the charge on the capacitor increases so that the voltage across the capacitor continues to increase due to the increase in charge and the resistor serves to drain off some of the charge and thus limit the voltage. The resistor also serves to discharge the capacitor between tests.

An object of the invention is to provide a new and improved apparatus for detecting impulse produced failures in insulated electrical windings.

Another object of the invention is to provide new and improved equipment for detecting impulse produced failures in transformer windings.

A further object of the invention is to provide an improved system for detecting impulse produced failures in distribution transformers.

The invention will be better understood from the following description taken in connection with the accompanying drawing and its scope will be pointed out in the appended claims.

In the drawing Fig. 1 illustrates diagrammatically an embodiment of the invention, Fig. 2 is a network having surge characteristics corresponding to those of a typical power transformer winding, Fig. 3 is a network having voltage surge characteristics corresponding to a typical distribution transformer winding, Figs. 4–9 inclusive are a set of oscillograms for comparing the results obtained with our invention and with previous systems for detecting impulse produced failures, and Figs. 10–15 inclusive are similar to Figs. 4–9 inclusive but are taken on a larger size transformer and involve a different kind of fault.

Referring now to the drawing, and more particularly to Fig. 1, there is shown therein a transformer 1 which is typically a distribution transformer. This transformer is provided with a line terminal 2 and a terminal 3 which is normally grounded in service and between which is connected the primary or exciting winding which is part of the core and coil structure indicated generally at 4. For impulse testing the transformer 1 there is shown schematically an impulse generator 5 of any suitable type which is connected to the line terminal 2 of the transformer and which also has a grounded terminal, as indicated at 6. Connected between ground and the normally grounded terminal 3 of the transformer 1 is a capacitor 7, the value of which will vary depending upon the size of the transformer to be tested and also upon the nature of the voltage impulse which is produced by the impulse generator 5. Connected to measure and preferably also record the voltage or drop across the capacitor 7 is any suitable device 8, such as a cathode ray oscillograph.

For controlling the voltage across the capacitor 7 and also for discharging the capacitor 7 between tests of transformers a resistor 9 is connected in shunt therewith. Good results have been obtained with capacitor-resistor combinations having a time constant of between 50 and 100 microseconds.

In the operation of the invention the impulse generator is caused to apply a voltage wave of predetermined and generally standardized steepness and height to the line terminal 2 and the current wave produced by this impulse is in effect measured by recording the voltage drop across the capacitor 7 on the oscillograph 8. The resulting oscillogram is then compared either with another oscillogram taken on the same transformer under reduced voltage impulse conditions or else it is compared with an oscillogram taken when a duplicate transformer which was known not to have a fault was tested under identical conditions and in this manner a comparison of the two oscillograms will indicate whether or not there has been a failure.

The reason why a resistor in place of the capacitor 7 does not give good results in the case of distribution transformers is because in such transformers the distributed series capacitance of the windings is relatively very much greater than in the larger size higher voltage windings, such as are used in power transformers. Thus, in Fig. 2 the capacitors $C_G$ represent the capacitance to ground of a power transformer winding, the capacitors $C_s$ represent the elemental distributed series capacitance elements of such windings and the elements L and R are the distributed series inductance and resistance of the same winding. A comparison of this with Fig. 3 which is representative of a distribution transformer winding shows that the distributed series capacitance $C_s$ is relatively very much greater. Consequently, under transient or impulse voltage conditions the initial current surge for a distribution transformer winding is relatively very much greater than for a power transformer winding because the larger value of $C_s$ represents a virtual initial short circuit of the winding under those conditions. Therefore, if a resistor is used there is a very high initial voltage on the oscillograph which it is practically impossible to interpret as it appears the same whether or not there is a fault on the winding and which also usually is so high as to go off scale on the instrument. Of course, it is possible to reduce the resistor to such a low value that this will not happen but if that is done the reading of the instrument during the latter part of the voltage impulse will be essentially zero and also will be uninterpretable or, at best, unreliable for indicating fault.

The capacitor 7, however, having transient characteristics which generally speaking more nearly match those of a distribution transformer, will tend to limit the initial voltage on the oscillograph, and as the charge on the capacitor 7 rises and hence its voltage rises, the effect of the resistor 9 becomes more pronounced in limiting the rise in voltage and holding the curve or indication of the oscillograph within bounds.

Figure 5:
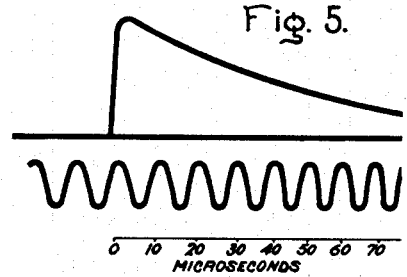
Figure 6:
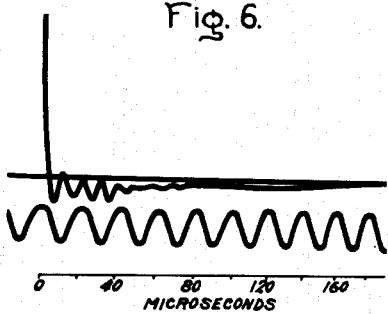
Figure 7:
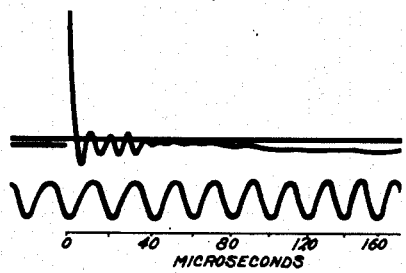
Figure 8:
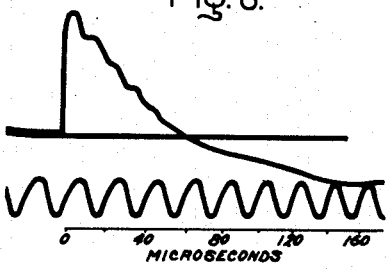
Figure 9:
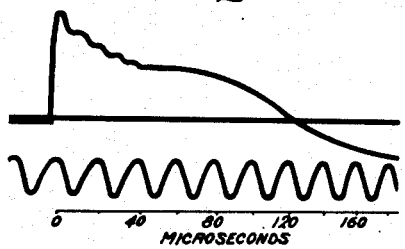

One of the oldest ways of detecting impulse produced failures in transformers is to measure the applied voltage wave on an oscillograph. Usually a voltage divider is used so that only a definite predetermined fraction of the total applied voltage wave is actually measured but the measured voltage is directly proportional to the total voltage. Fig. 4 is an oscillogram of such an applied voltage wave to a 1½ kv.-a., 7,200 volt distribution transformer which has no failure. Fig. 5 is a record of the same voltage wave applied to the same transformer when it has one turn of the tested winding short circuited and a comparison of Figs. 4 and 5 shows that for all intents and purposes they are identical and that no indication of such a fault is obtainable by this method. Fig. 6 is a curve of the voltage wave across a resistor, instead of the capacitor 7, for the same transformer to which the same voltage impulse was applied and before there was a failure. Fig. 7 differs from Fig. 6 in that the winding has a one-turn failure and again a comparison of Figs. 6 and 7 shows that it is practically impossible to detect this fault when a resistor is used for measuring the impulse current. The relatively high initial peak voltage across the resistor which was previously mentioned is clearly shown in Figs. 6 and 7 and actually this goes beyond the boundaries of the picture in both cases. Fig. 8 is a curve of the voltage across the capacitor 7 for the same transformer when the same voltage impulse is applied and before the transformer has any failure, while Fig. 9 shows the change which takes place when there is a failure or short circuit of one turn of the winding. The difference in shape of the curves in Figs. 8 and 9 is very pronounced and clearly indicates this failure of but a single turn.

Figure 10:
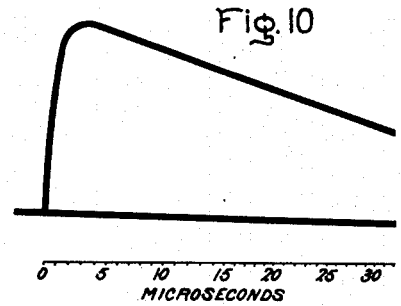
Figure 11:
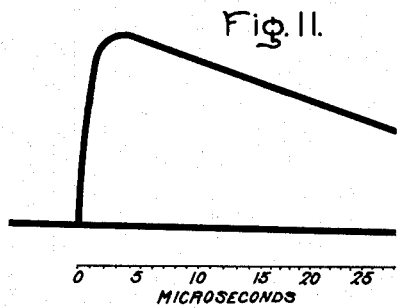
Figure 12:
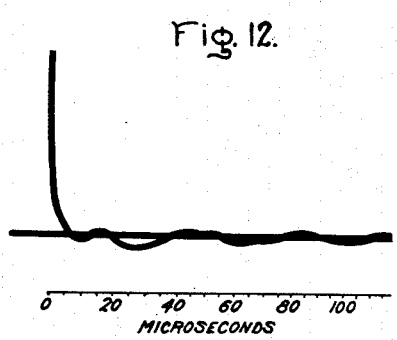
Figure 13:
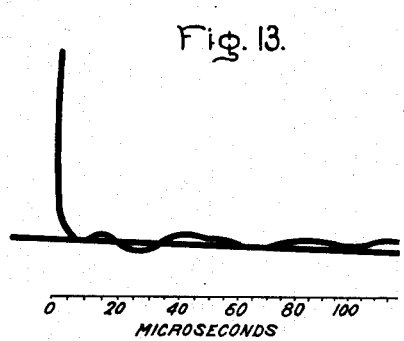
Figure 14:
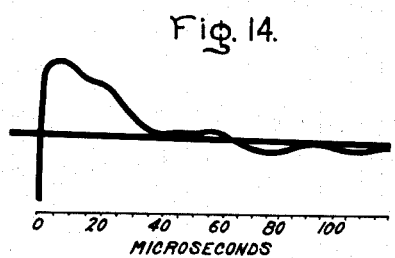
Figure 15:
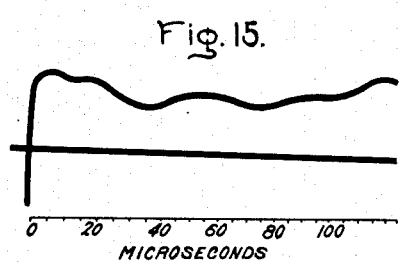

The remaining Figs. 10-15 inclusive were taken on a 5 kv.-a., 13,800 volt transformer. Figs. 10-15 indicate the relative ability of prior schemes and applicants' invention to detect a layer failure in such a transformer. Figs. 10 and 11 illustrate the results obtained by the applied voltage measurement test, Fig. 10 being taken when there was no failure and Fig. 11 being taken when there was a layer failure and a comparison of these figures shows that such failure is not detectable by the applied voltage method. Figs. 12 and 13 illustrate the resistive shunt method, that is to say, the oscillograph is shunted by a resistor, Fig. 12 being taken when there was no failure and Fig. 13 being made when there was a layer failure and here again the difference between the figures does not give a reliable indication of the failure. Figs. 14 and 15 are illustrative of applicants' method, Fig. 14 being made when there was no failure and Fig. 15 being made when there was a layer failure and it will be seen that these two figures are materially different.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What we claim as new and desire to secure by Letters Patent of the United States is:

1. Apparatus for impulse testing a transformer winding which has a transient characteristic which is predominantly capacitive at the equivalent frequency of the voltage wave front of an impulse generator comprising, in combination, a capacitor for series connection with said winding, an impulse generator for applying steep wave front testing voltage impulses across said winding and capacitor in series, a voltage wave recorder connected across said capacitor, and a resistor connected in parallel with said capacitor for limiting the ultimate voltage rise across said capacitor while having negligible effect on the initial voltage across said capacitor when said voltage wave is first applied.

2. Apparatus as in claim 1 in which said capacitor and resistor are so proportioned as to have a time constant at least as high as 100 microseconds.

HAROLD C. STEWART.
JAMES E. HOLCOMB.

REFERENCES CITED

The following references are of record in the file of this patent:

UNITED STATES PATENTS

| Number | Name | Date |
|---|---|---|
| 1,549,456 | Creighton | Aug. 11, 1925 |
| 2,032,904 | Bellaschi | Mar. 3, 1936 |
| 2,185,292 | Candler et al. | Jan. 2, 1940 |
| 2,194,572 | Schlesinger | Mar. 26, 1940 |
| 2,200,233 | Whitehead | May 7, 1940 |
| 2,321,424 | Rohats | June 8, 1943 |